Aug. 26, 1941.   C. S. CRICKMER   2,254,060
PACKING ELEMENT
Filed April 20, 1939
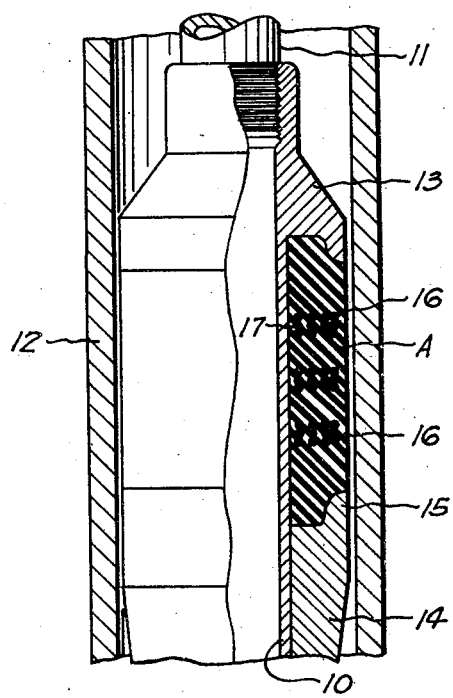
Fig. 1.
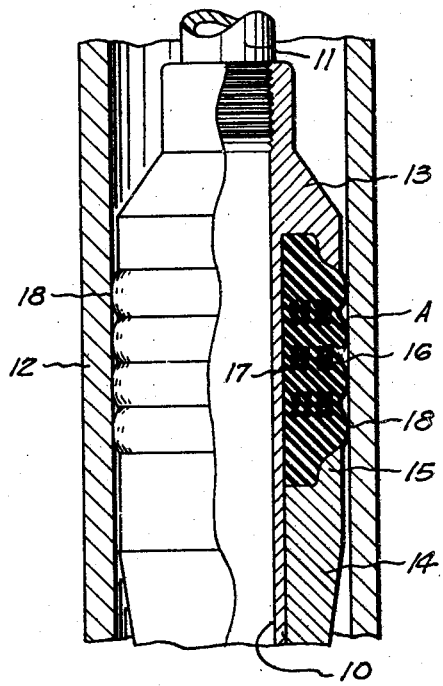
Fig. 2.
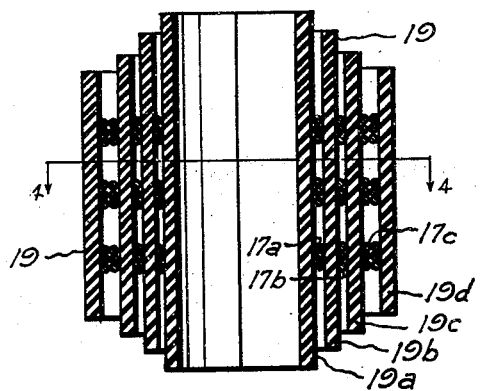
Fig. 3.
Fig. 4.
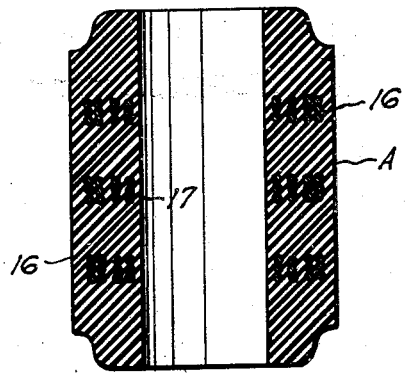
Fig. 5.
Inventor
Charles S. Crickmer
By Jack A. Ashley
Attorney Patented Aug. 26, 1941

2,254,060

UNITED STATES PATENT OFFICE 2,254,060

PACKING ELEMENT

Charles S. Crickmer, Dallas, Tex., assignor to Merla Tool Company, Dallas, Tex., a firm of Texas Application April 20, 1939, Serial No. 268,923

5 Claims. (Cl. 166—10)

This invention relates to new and useful improvements in packing elements and the method of manufacturing the same.

One object of the invention is to provide an improved packing element which is particularly adapted to be used on a well packer or other device to effectively seal off the annular space between the well casing and well tubing.

An important object of the invention is to provide an improved packing element having a plurality of reinforcing members molded therein, the members being in the form of wires of a relatively small diameter, whereby an efficient reinforcement for the element is provided in a minimum amount of space.

Another object of the invention is to provide an improved packing element having a plurality of concentric layers of resilient material which are vulcanized together, each inner resilient layer being surrounded by a plurality of spaced reinforcing means which tend to fasten each inner layer to its adjacent inner layer so that when the element is distorted, the reinforcing means acts to displace the outer periphery of said element into a series of super-imposed annular bulges or protuberances, whereby the packing effect of a plurality of super-imposed individual packing members is obtained.

A further object of the invention is to provide an improved packing element including a plurality of concentric resilient sleeves which are vulcanized, or otherwise secured together, and which have a plurality of reinforcing members confined therebetween at spaced points throughout their length, the members not only acting to prevent distortion of the element beyond its elastic limit but also aiding said element to return to its normal undistorted position after it has been distorted to a packing-off position, whereby said members and the inherent elasticity of the element co-act or cooperate to return said element to such normal position.

A particular object of the invention is to provide an improved method of manufacturing a packing element which includes forming a cylindrical sleeve of resilient material, wrapping the sleeve with wire at a plurality of points spaced longitudinally of said sleeve, placing a second resilient sleeve around the inner wrapped sleeve, continuing these steps alternately until the desired thickness is obtained, and then vulcanizing the sleeves to cause cohesion of the resilient material of said sleeves which flows around the wire wrappings to embed the same, whereby a reinforced packing element is produced.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a view, partly in elevation and partly in section, of a packing element constructed in accordance with the invention, Figure 2 is a similar view of the element in its distorted position, Figure 3 is a transverse, vertical, sectional view of the element, showing the arrangement of the resilient sleeves or layers and the reinforcing wires prior to vulcanization, Figure 4 is a horizontal, cross-sectional view, taken on the line 4—4 of Figure 3, and Figure 5 is a transverse, vertical, sectional view of the finished packing element.

In the drawing, the numeral 10 designates an elongate, tubular mandrel which is provided with internal screw threads at its upper end. The upper end of the mandrel is screw-threaded upon the lower end of a well tubing 11, or other support, so that said mandrel may be lowered with the tubing into a well casing 12. The invention is applicable to any device, but for the purposes of description, it is shown as mounted on the mandrel of a well packer. A flanged confining cap or inverted thimble 13 may be made integral with the upper end of the mandrel. A slip head or cone 14, having an upwardly extending annular flange 15 provided on its upper end, is slidable on the mandrel and the usual gripping slips (not shown) are slidable on the cone. When the slips are engaged with the wall of the casing, the cone 14 is held stationary and the mandrel may slide therethrough. The slips have not been shown, as they form no part of the invention, and any suitable means may be employed for locking the cone in a fixed position in the casing.

An annular, elastic packing element A, formed of rubber, Duprene, or any other suitable resilient material, surrounds the mandrel and has its reduced upper end confined within the confining cap 13, while its reduced lower end is disposed within the annular flange 15 of the cone 14. A plurality of spaced metallic reinforcing wire rings 16 are embedded, or otherwise suitably mounted, within the packing element A, being disposed longitudinally thereof in superimposed horizontal planes. It is pointed out that each ring 16 includes a plurality or series of individual wires 17 and that the rings are spaced apart in vertical alinement with each other as shown in Figure 3. Manifestly, the resilient material of which the packing element is constructed will surround the series of wires 17, whereby the rings 16 are rigidly affixed within said element.

When the device has been lowered into position within the well casing, with the packing element in its normal or undistorted position (Figure 1), the slips (not shown) are moved into gripping engagement with the wall of said casing, thereby holding the slip cone 14 stationary. Since the mandrel is slidable through the cone it may move downwardly and the cap 13 being integral with said mandrel moves downwardly therewith. The downward movement of the cap toward the flange 15 of the stationary cone distorts the packing element A therebetween. Since the wire rings 16, embedded within the element, are compressed therewith into closer proximity to each other, said element is distorted between each pair of rings into annular protuberances or bulges 18, as shown in Figure 2. That portion of the element in the plane of each ring will be held in substantially its normal undistorted position by the ring because it is firmly affixed thereto. The distortion of the packing element causes the same to move into engagement with the wall of the well casing, whereby a seal is formed between said casing and the mandrel.

It is noted that the protuberances formed by distortion of the element have substantially the same sealing effect as a series of superimposed individual packing rings, yet the element is formed in a single piece and retains the strength and durability of a one-piece packing element. It is further noted that the provision of the spaced wire rings 16 within the element serves to reinforce the same throughout its length, whereby said element is strengthened and made more rigid. It is also noted that distortion of the element beyond the elastic limit of its material is substantially eliminated by the spaced rings, which retain those portions of the element secured thereto in a fixed position with relation to the mandrel.

The method of manufacturing the reinforced packing element A is an important feature of the invention, said element being formed by a plurality of concentric layers or sleeves 19, of rubber or other suitable elastic or resilient material, as shown in Figure 3. A tubular inner sleeve or core 19a of the resilient material is formed around a mandrel or other cylindrical object (not shown) and is fastened in place by a plurality of longitudinally spaced wires 17a. A second layer 19b of the elastic material is then wrapped around the sleeve 19a and is secured thereto by a second set of wires 17b which are spaced longitudinally of the layer 19b. A third layer 19c encircles the second elastic layer and is followed by a plurality of spaced wires 17c. This last set or series of wires may be of a double thickness, as is clearly shown in Figure 3. An outer layer or sleeve 19d is then positioned around the third layer to complete the assembly step. It is pointed out that the layers of resilient material diminish or vary progressively in length, whereby the inner layer 19a is the longest and the outer layer 19d is the shortest.

The assembly is then placed within a suitable press (not shown) and vulcanized to bring about cohesion of the resilient sleeves or layers, whereby the material of which said layers are constructed flows around and surrounds the reinforcing rings of wire. Thus, the rings 16 are rigidly affixed or embedded within the packing element A, as is clearly shown in Figure 5. Obviously, the reduced ends of the packing element are made possible by the varying lengths of the layers or sleeves. It is noted that thickness of the wall of the element may be increased by adding additional layers of resilient material and rings of wire to the assembly before it is vulcanized.

It is pointed out that by the use of the wire reinforcing rings 16 it is possible to form the packing element in layers which it not only more economical to manufacture but more efficient in use. Heretofore, reinforced packing elements have been made by vulcanizing together a plurality of superimposed cups or "biscuits" which are spaced apart by the usual reinforcing rings. The finished packing element would then have a plurality of lateral seams which would extend entirely through the wall of said element and which would be exposed to well pressure. By forming the element in layers, only one vertical seam is exposed to the well pressure and this seam does not extend entirely through said element, since the seam of each layer is staggered as shown in Figure 4. Thus, a more efficient and durable packing element is provided.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent, is:

1. A packing element for an oil well packer including, a cylindrical elastic body, and a plurality of annular reinforcing members embedded in the body and spaced longitudinally thereof, each reinforcing member being formed of a plurality of flexible rings disposed in a transverse plane.

2. A packing element for an oil well packer including, a cylindrical elastic body, and a plurality of annular reinforcing members embedded in the body and spaced throughout the length thereof, each member being formed of a plurality of transversely-disposed individual wires.

3. A well packer including, a cylindrical elastic body having embedded therein longitudinally spaced groups of annular reinforcing members, each group comprising annuli disposed one within the other to provide transverse reinforcement within the body, the groups being spaced inwardly from the ends of said body.

4. A well packer including, a cylindrical elastic body having embedded therein longitudinally spaced groups of reinforcing annuli, each group comprising rings spaced transversely in the body, whereby the elastic material of said body lies between the rings and is bonded to the surfaces of the annuli.

5. A well packer including, a cylindrical elastic body, and transverse reinforcing sections within the body comprising alternate elastic and non-elastic concentric annular portions, the sections being spaced longitudinally throughout the length of said body.

CHARLES S. CRICKMER.